No. 711,303. Patented Oct. 14, 1902.
J. E. FREDRICK.
BARB WIRE MACHINE.
(Application filed Feb. 3, 1902.)
(No Model.) 7 Sheets—Sheet 1.
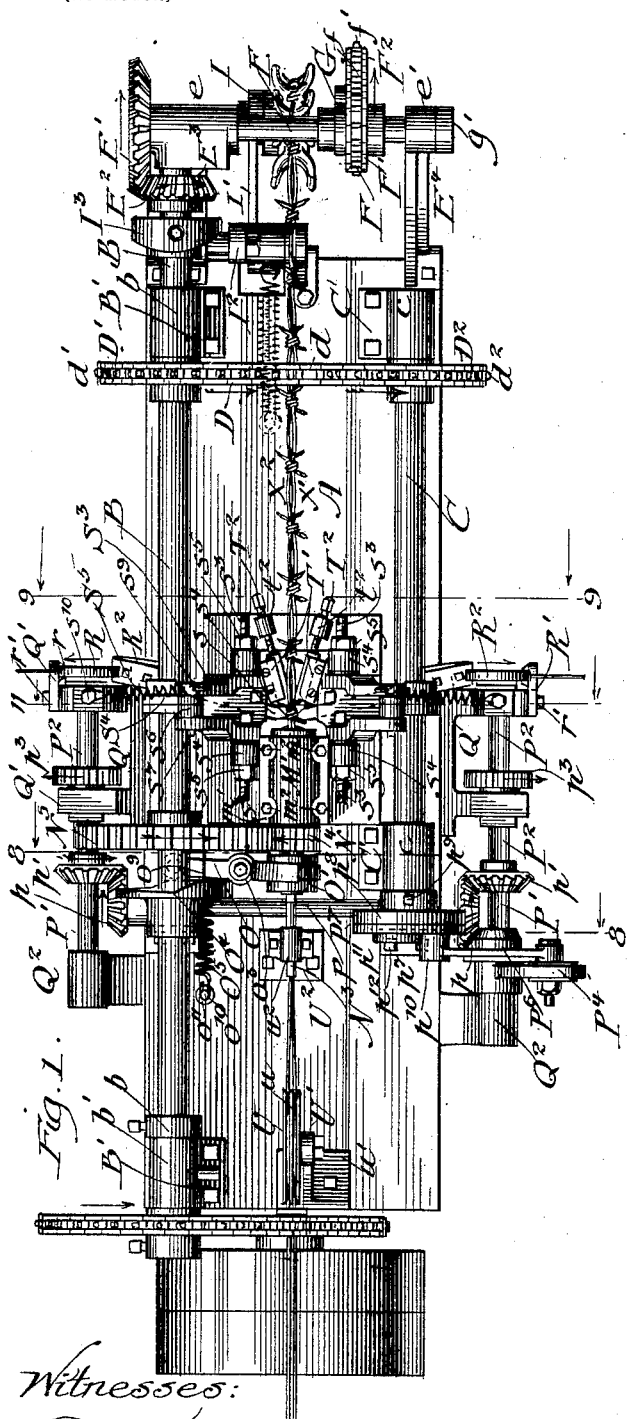
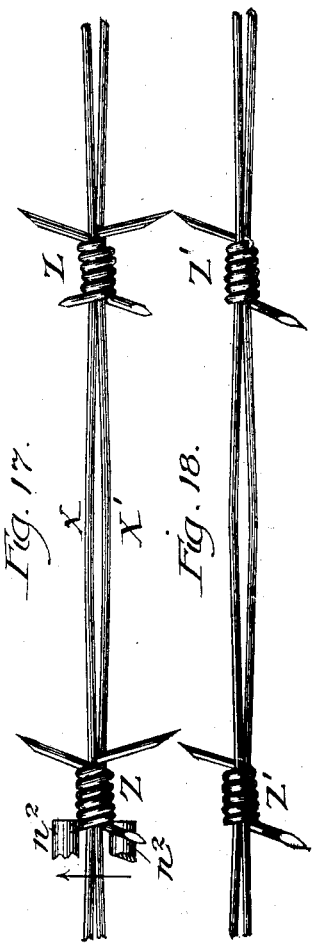
Witnesses:
Frank S. Blanchard
Oscar W. Bond
Inventor
John E. Fredrick
By Banning & Banning,
Attorneys.

No. 711,303. Patented Oct. 14, 1902.
J. E. FREDRICK.
BARB WIRE MACHINE.
(Application filed Feb. 3, 1902.)
(No Model.) 7 Sheets—Sheet 2.
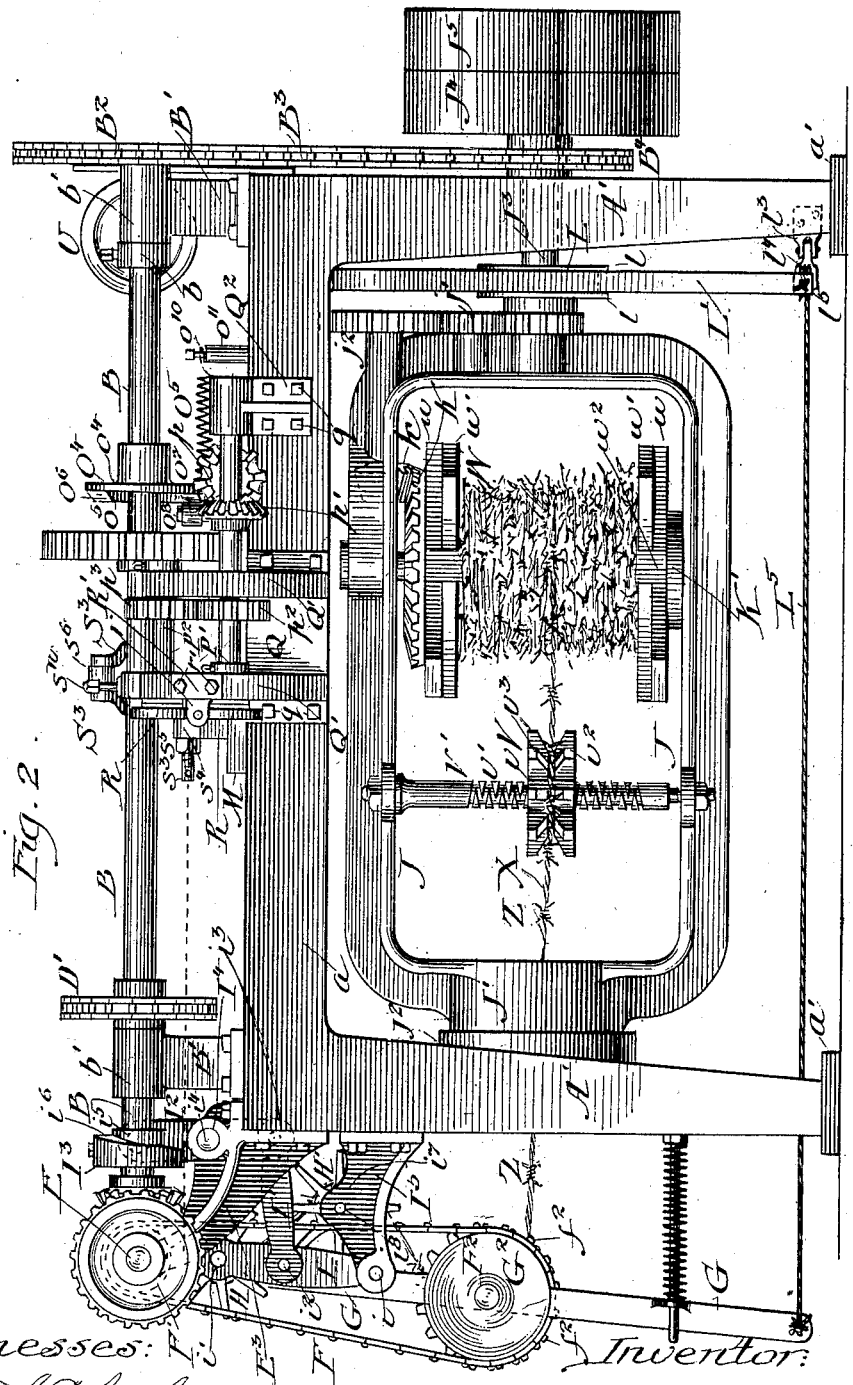

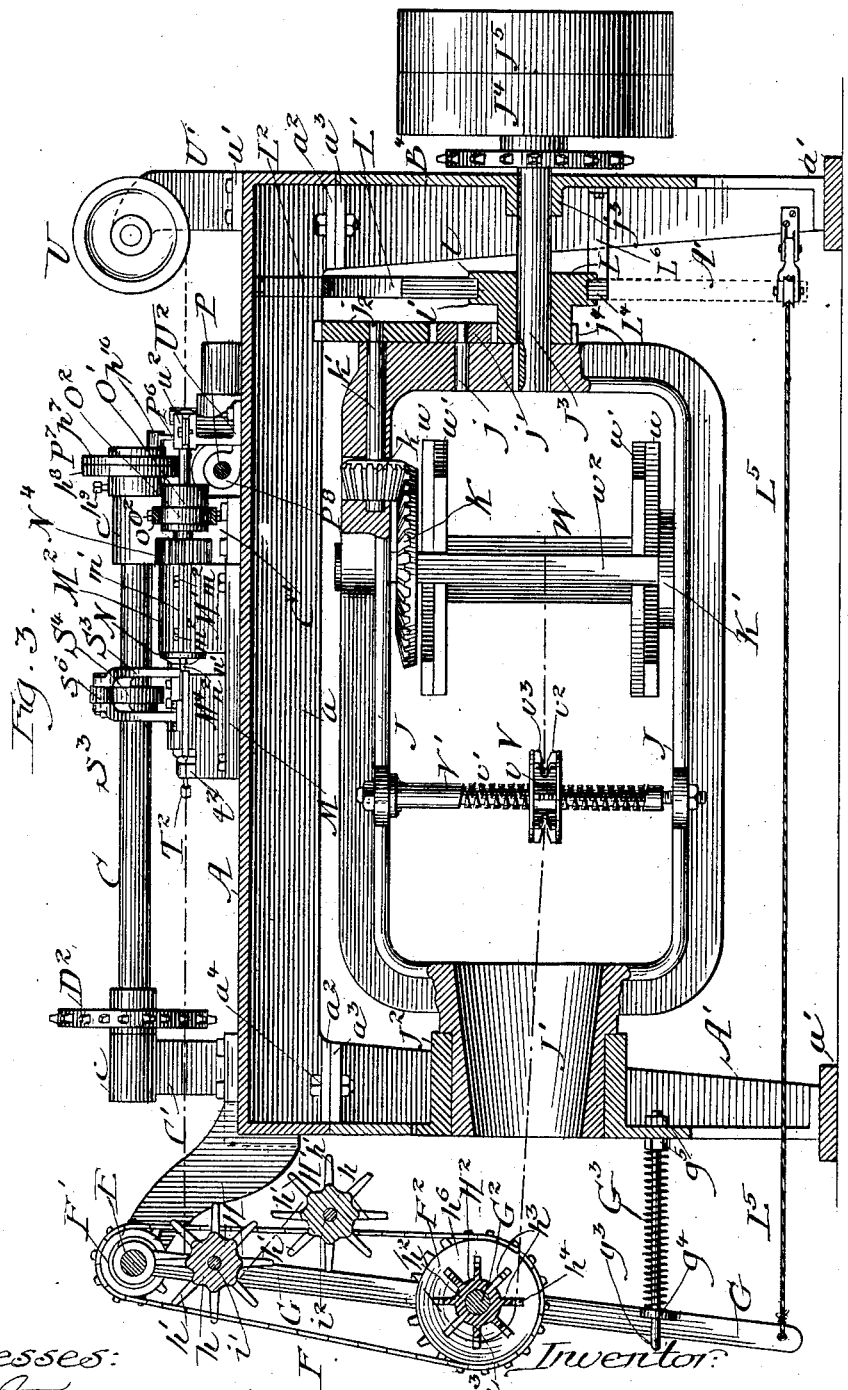

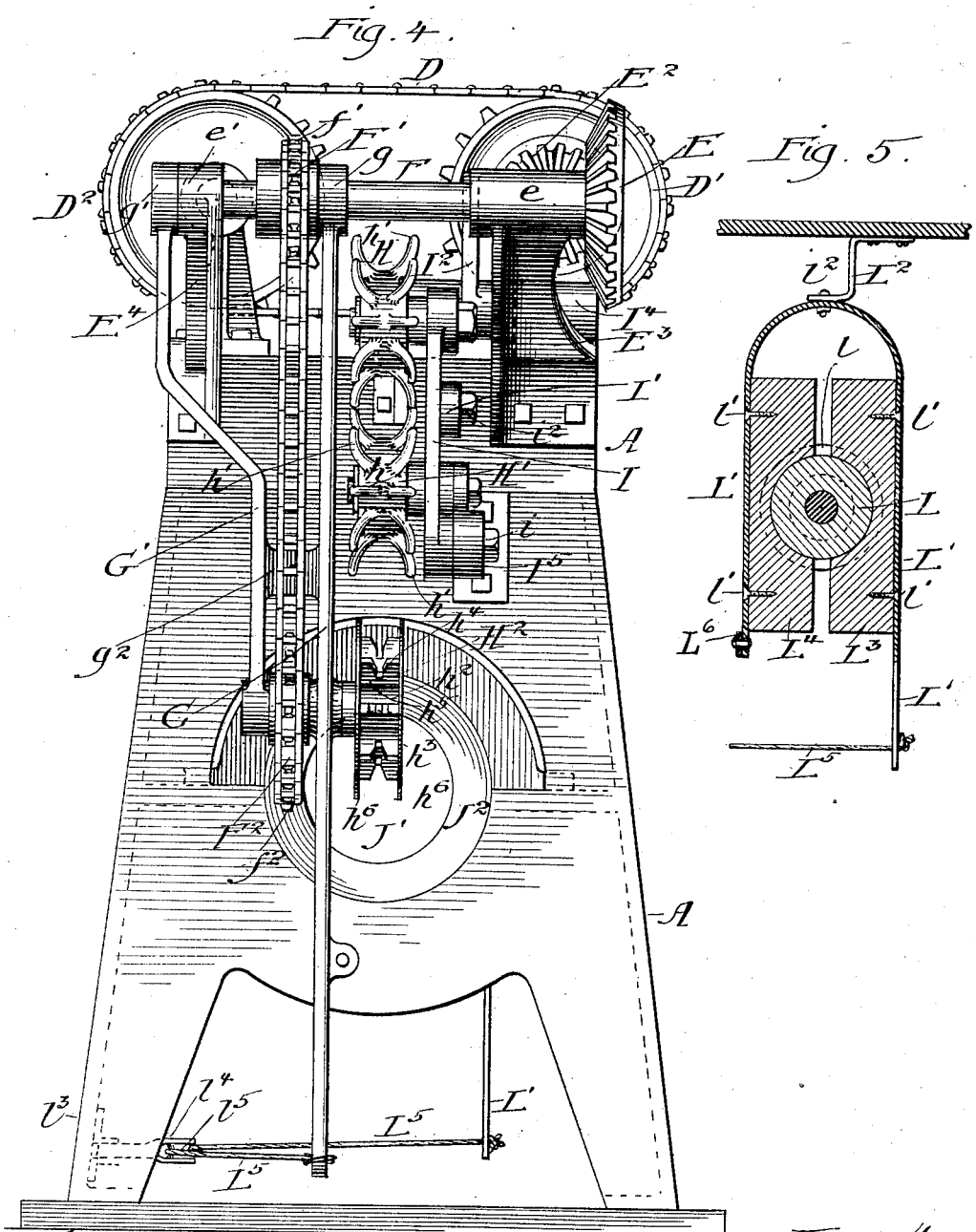

No. 711,303. Patented Oct. 14, 1902.
J. E. FREDRICK.
BARB WIRE MACHINE.
(Application filed Feb. 3, 1902.)
(No Model.) 7 Sheets—Sheet 5.
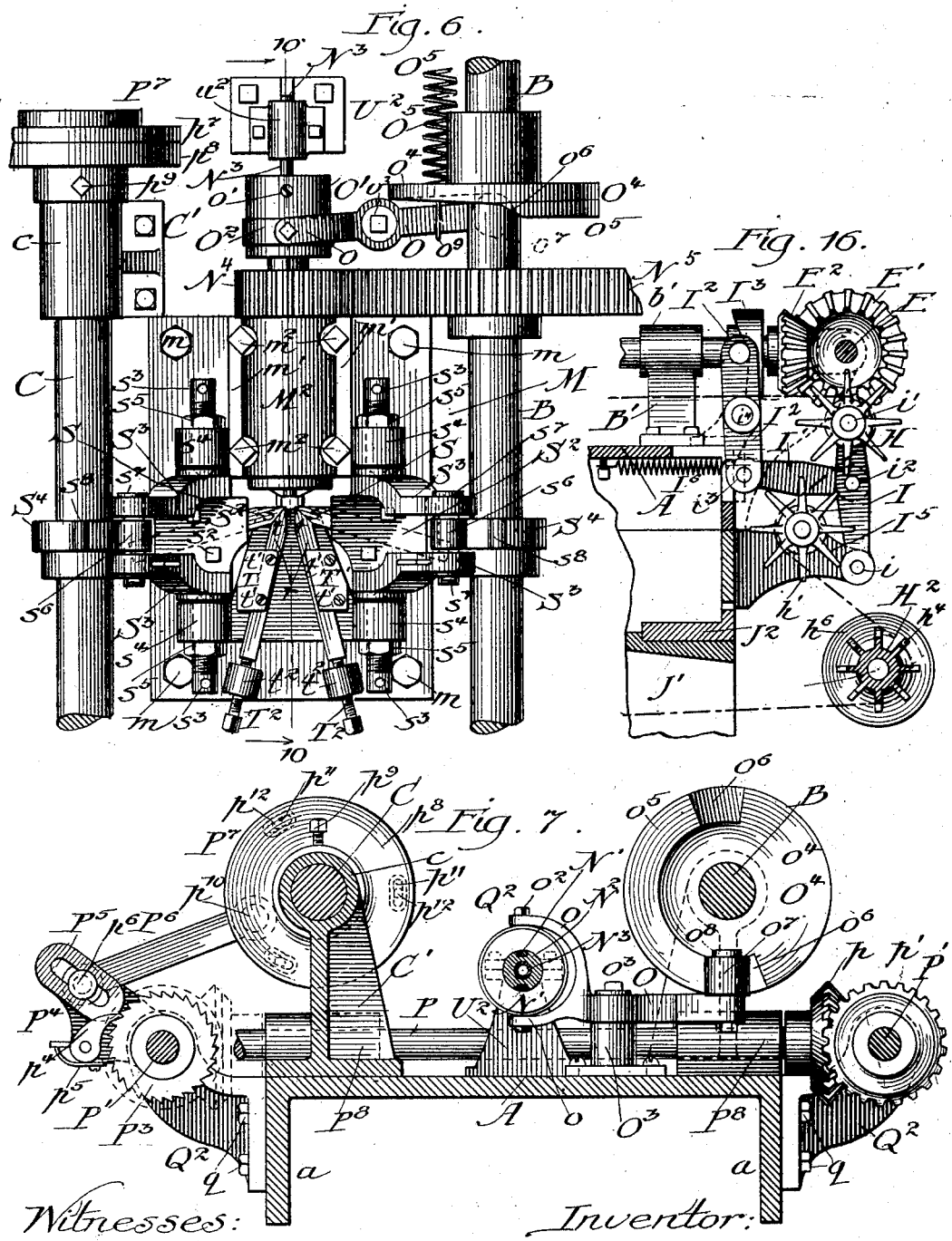
Witnesses: Inventor:
Frank J. Blanchard John E. Fredrick
Oscar W. Bond By Banning & Banning,
Attorneys.

No. 711,303. Patented Oct. 14, 1902.
J. E. FREDRICK.
BARB WIRE MACHINE.
(Application filed Feb. 3, 1902.)
(No Model.) 7 Sheets—Sheet 6.
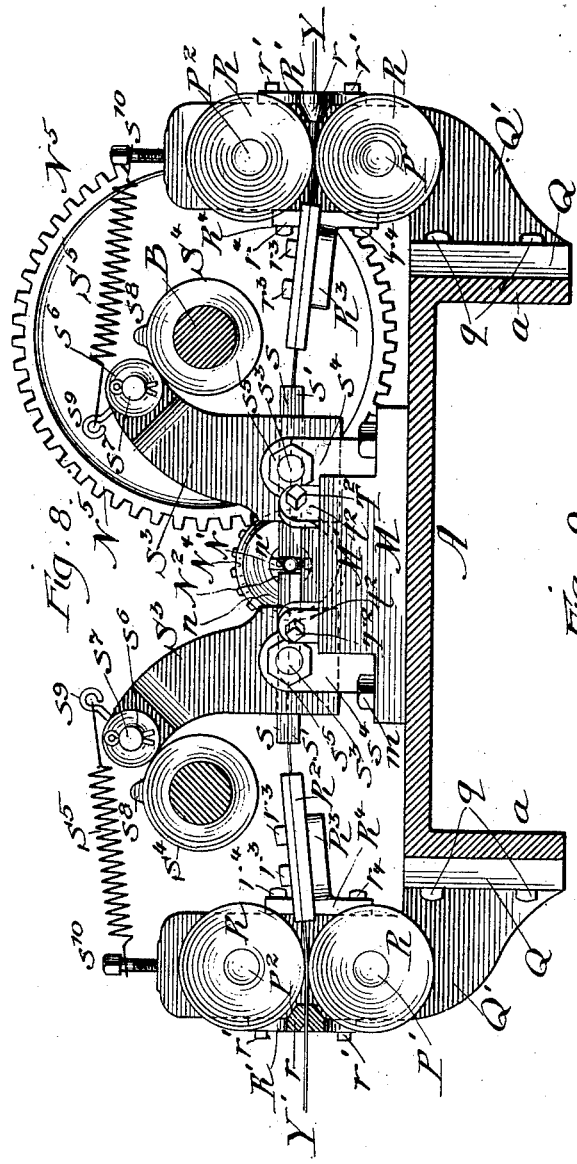
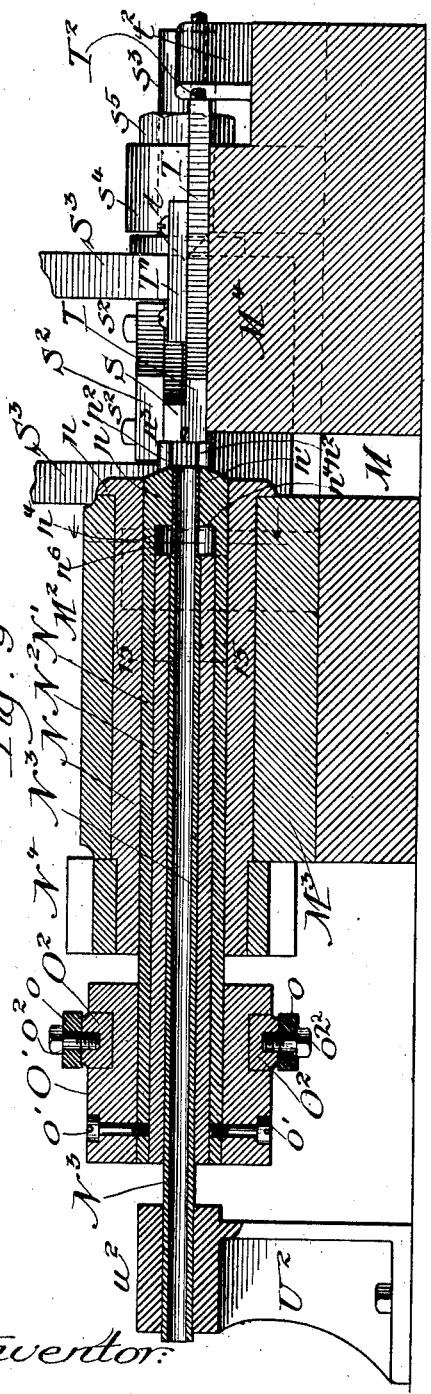
Witnesses:
Frank Blanchard
Oscar W. Bond
Inventor:
John E. Fredrick
By Banning & Banning,
Attorneys.
THE NORRIS PETERS CO., PHOTO-LITHO., WASHINGTON, D. C.

No. 711,303. Patented Oct. 14, 1902.
J. E. FREDRICK.
BARB WIRE MACHINE.
(Application filed Feb. 3, 1902.)
(No Model.) 7 Sheets—Sheet 7.
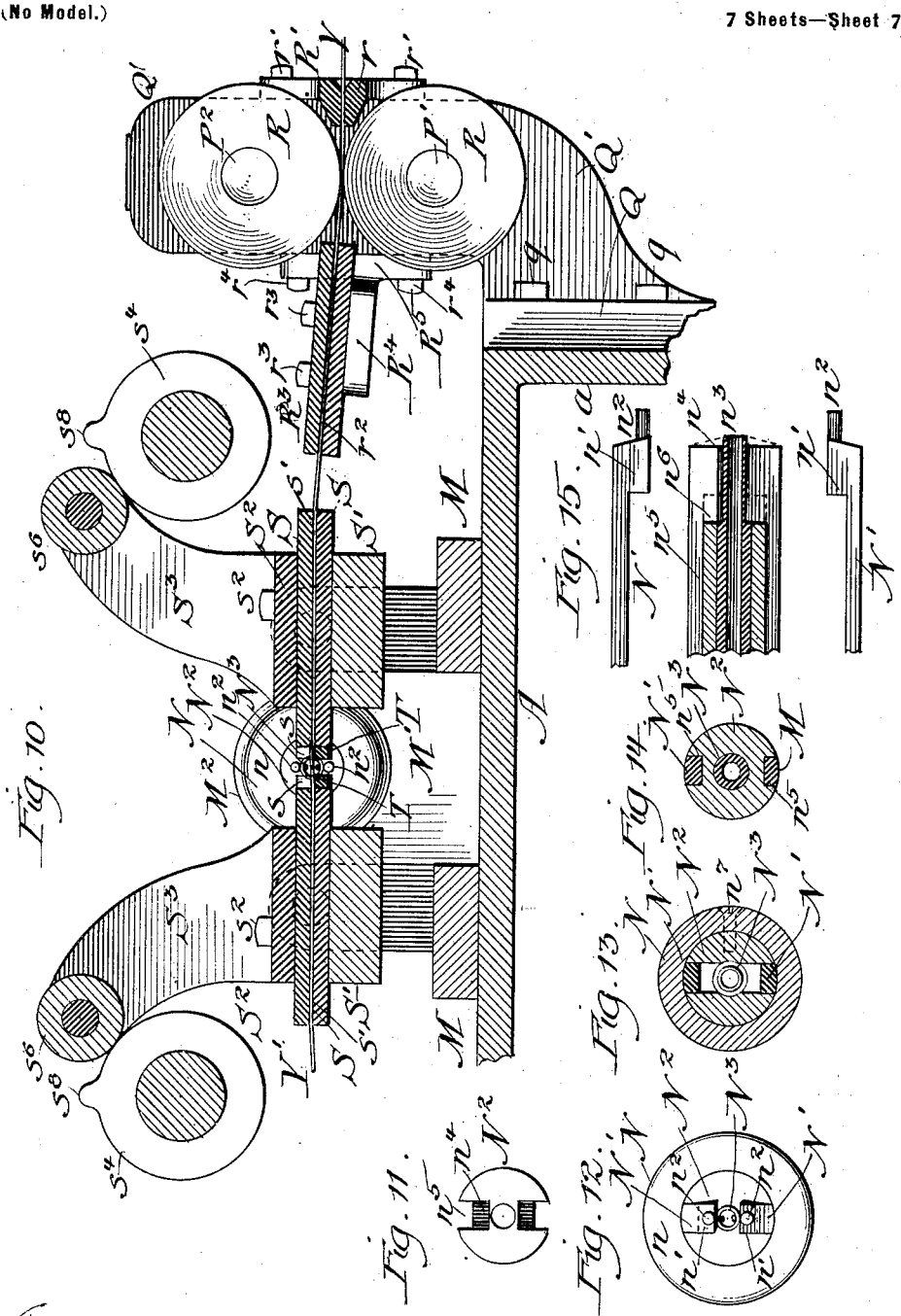
Witnesses:
Frank Blanchard
Oscar W. Bond
Inventor:
John E. Fredrick
By Banning & Banning
Attorneys.
THE NORRIS PETERS CO., PHOTO-LITHO., WASHINGTON, D. C.

UNITED STATES PATENT OFFICE.

JOHN E. FREDRICK, OF KOKOMO, INDIANA.

BARB-WIRE MACHINE.

SPECIFICATION forming part of Letters Patent No. 711,303, dated October 14, 1902.

Application filed February 3, 1902. Serial No. 92,403. (No model.)

*To all whom it may concern:*

Be it known that I, JOHN E. FREDRICK, a citizen of the United States, residing at Kokomo, in the county of Howard and State of Indiana, have invented a certain new and useful Improvement in Barb-Wire Machines, of which the following is a specification.

This invention relates to that type of barb-wire machines in which the barb is cut from a cross-wire fed between the two wires of a two-strand main wire and twisted or coiled around the strand or main wires and in which the wire is rolled onto a reel as produced on the machine, the reeling operation being automatically performed in conjunction with the operation of the barb-applying mechanism.

The objects of the invention are to improve the construction and operation of the twisting mechanism for applying the barbs to the strand or main wire, to improve the devices for cutting or severing the barb-wires from the cross-wires from which the barbs are cut, to improve the construction and operation of the feeding mechanism between the twisting mechanism for the barbs and the reel, to improve the construction and operation of the means controlling the revolving of the reel in correlation with the feeding appliance for the barbed wire to the reel, to improve the operation of the brake controlling the revolution of the reel, and to improve generally the construction and operation of the several devices and mechanisms which enter into the construction and operation of the machine as a whole.

The invention consists in the features of construction and combinations of parts hereinafter described and claimed.

In the drawings, Figure 1 is a top or plan view of the machine; Fig. 2, a side elevation of the machine; Fig. 3, a central longitudinal sectional elevation of the machine, showing the twisting mechanism for the barbs in full elevation; Fig. 4, an end elevation of the machine; Fig. 5, a detail in section, showing the brake shoes or blocks for controlling the revolution of the reel; Fig. 6, an enlarged top or plan view of the twisting mechanism and the cutting devices for the barb-wires; Fig. 7, a cross-section showing the twisting-tube for the barb-wires, the arm or lever and cam for advancing and receding the twisting-tube, and the feed devices of the cross-wires for the barbs; Fig. 8, a cross-section showing an end elevation of the twisting mechanism for the barbs and the feeding devices for entering the barb-wires; Fig. 9, a central longitudinal section through the twisting mechanism for the barbs; Fig. 10, a cross-section broken away on one side, showing the feeding mechanism and the cutting devices for the barb-wires; Fig. 11, a detail, being an end view of the guide-tube for the strand or main wires, with the slides carrying the twisting-pins for the barb-wires removed; Fig. 12, a detail, being an end view of the twisting-head for the barb-wires complete; Fig. 13, a cross-section through the twisting-head; Fig. 14, a cross-section through the feed-tube and the tube carrying the reciprocating bars of the twisting-pins; Fig. 15, a detail, partly in section, showing the end of the twisting-tube and the feed-tube, with the twisting bars and pins separated therefrom; Fig. 16, a detail, partly in section, of the delivery end of the machine, showing the butterfly feed-wheels and their supports; Fig. 17, a detail showing a wire with four barbs thereon and showing also the twisting-pins in the act of completing two of the barbs, and Fig. 18 a detail showing the wire with two barbs coiled thereon.

The operative parts or mechanisms of the machine are mounted on a bed or table A, which, as shown, has depending flanges $a$ on the sides and ends, and this bed or table is attached to end supports A', each support having a web and leg, each leg terminating in a foot or flange $a'$ for attachment to a floor or otherwise, and, as shown, the bed or table has at each corner a flange $a^2$, which coincides with a flange $a^3$ on the support, through which flanges a bolt or bolts $a^4$ pass for securing the bed or table to the end supports or standards. A drive-shaft B is located and extends the full length of the bed or table on one side of the machine, its ends projecting beyond the ends of the bed or table. The shaft B is mounted in suitable journal boxes or bearings $b'$ on the ends of standards or uprights B', secured to the bed or table, and, as shown, is held against end play or movement in one direction by a collar $b$, abutting against the end face of the journal box or bearing of one of the standards, and is held against end play or movement in the opposite direction by engagement of the hubs of the sprocket or chain wheels mounted on and driven from the shaft. A drive-shaft C of a less length than the drive-shaft B is located on the opposite side of the bed or table and extends from or near the terminus of the table at one end to a point beyond the center of the bed or table longitudinally. The shaft C is supported in journal bearings or boxes $c$ on standards or uprights C', attached to the bed or table. The shaft B at one end has fixed thereon a sprocket or chain wheel $B^2$, on which runs a sprocket or drive chain $B^3$, driven from a sprocket or chain wheel $B^4$ on the main driving-shaft, as shown in Figs. 1 and 2. The drive-shaft B drives the shaft C through a drive-chain D, running over a sprocket-wheel D' on the shaft B and a sprocket-wheel $D^2$ on the shaft C, the links $d$ of the sprocket-chain meshing with the teeth $d'$ of the wheel D' and with the teeth $d^2$ of the wheel $D^2$, as usual in the operation of sprocket wheels and chains. The sprocket-wheels D' and $D^2$ are of the same diameter, and the two shafts will have a corresponding rotation.

The delivery end of the machine has a drive-shaft E, driven from a bevel-gear E' and a bevel-pinion $E^2$, the pinion being fixed to the end of the drive-shaft B, and the shaft E is supported by bracket-arms $E^3$ and $E^4$, attached to the end of the bed or table or otherwise, and the shaft is journaled in a journal bearing or box $e$ on the end of the bracket-arm $E^3$ and a journal bearing or box $e'$ on the end of the bracket-arm $E^4$ in the arrangement shown and stands above and away from the end of the bed or table, so as to leave a clear space between the end of the bed or table and the shaft, as shown in Figs. 1, 2, 3, and 4. A drive-chain F runs over a sprocket or chain wheel F' on the shaft E and over a sprocket or chain wheel $F^2$ in a lower plane than the sprocket or chain wheel F', so that the rotation of the shaft E will drive the chain F and impart rotation to the sprocket or chain wheel $F^2$, the links $f$ of the chain F meshing with the teeth $f'$ of the wheel F' and the teeth $f^2$ of the wheel $F^2$, as usual in the operation of sprocket or chain wheels and drive-chains. The sprocket or chain wheel $F^2$ is carried between swinging or oscillating bars G and G', both pivotally supported or mounted on the shaft E, so as to swing or oscillate from the shaft, and, as shown, the bar or arm G is mounted on the shaft E by a band or ring $g$ adjacent to the hub of the sprocket or chain wheel F', and the bar or arm G' is mounted on the end of the shaft E by a band or ring $g'$ adjacent to the journal bearing or box of the bracket-arm $E^4$, in which the shaft is mounted. The wheel $F^2$ is fixed to a journal or pin $G^2$, supported in the swinging or oscillating bars or arms for the journal or pin to be free to revolve in the arms, and, as shown, the bars or arms are connected one to the other by a cross-piece or web $g^2$, so as to maintain a unity of relation and swing between the two.

A butterfly-wheel H is located at the delivery end of the machine below the cross-shaft E, and below the butterfly-wheel H and nearer to the end of the bed or table is a second butterfly-wheel H', which coacts with the butterfly-wheel H in carrying the barbed wire. Each butterfly-wheel H and H' has a center or hub $h$, with outwardly-curved horns or arms $h'$, leaving an open space between the arms or horns. A third butterfly-wheel $H^2$ is fixed to the journal $G^2$ of the wheel $F^2$ and rotates therewith. This butterfly-wheel $H^2$, as shown, has a center or hub $h^2$, with radial wings $h^3$, each wing having in its end a slot, with a diverging portion $h^4$ and a straight portion $h^5$, as shown in Fig. 4. The butterfly-wheel H is carried by an arm or bar I, the lower end of which is pivotally connected by a pin or pivot $i$ to the outer end of a bracket-arm $I^5$, bolted or otherwise attached to the web of the adjacent end support. The upper end of the bar or arm I carries a journal or pin $i'$, on which the butterfly-wheel H is mounted. The arm or bar I at or near its center has pivotally connected thereto by a suitable pin or pivot $i^2$ a link or arm I', the other end of which is connected by a pin or pivot $i^3$ to the lower end of a lever or bar $I^2$ on a journal $i^4$ in a bearing or box $I^4$, attached by a plate or bracket-arm to the end of the bed or table, as shown in Figs. 1, 2, and 4. The upper end of the arm or lever $I^2$ carries a roller or pin $i^5$, which engages with a cam-face $i^6$ on a cam $I^3$, fixed on the shaft B and revoluble with such shaft for the engagement of the cam-face with the roller or pin to rock the arm $I^2$ on its journal or pin $i^4$ in one direction to have the lower end of the arm move in the opposite direction, and through the link I' swing the upper end of the arm or bar I, with the butterfly-wheel H, in the direction of the movement of the lower end of the arm or bar $I^2$ from the cam, and, as shown, the arm or bar $I^2$ is moved in the opposite direction and back to normal position by a coiled spring $I^6$, one end of which is attached to the lower end of the bar and the other end to a stud or pin depending from the under face of the bed or table. The movements of the arms or bars and the connecting-link are such as to have the advance of the butterfly-wheel H take place at the completion of an operation of the barb-coiling mechanism in coiling a barb onto the strand or main wire, and during the severing of the cross wire or wires for the barb or barbs the butterfly-wheel H is in normal position and remains in such position until the completion of the coiling operation for the barb or barbs. The bracket-arm $I^5$ has an upwardly-extending web or flange $i^7$, carrying a journal or pin $i^8$, on which is mounted the butterfly-wheel H', which has a stationary or fixed position, while the butterfly-wheels H and $H^2$ have a swing or oscillation coincident with the swing or oscillation of the arm or bar I and the arm or bar G, carrying the two butterfly-wheels, respectively.

A reel-carrying frame J is located and operates below the bed or table, and this frame at one end has a tubular neck or journal J', which is mounted in the journal box or bearing J² on the web of the end support of the bed or table adjacent to the butterfly-wheels. The opposite end of the reel-frame is keyed or otherwise attached fixedly to a shaft J³, extending through a bearing $j^3$ on the web of the end support of the bed or table and having on its projecting end fast and loose pulleys J⁴ and J⁵ for imparting rotation to the shaft from a suitable source of power, and this shaft J³ constitutes the main driving-shaft of the machine as a whole and has fixed thereto the sprocket or chain wheel B² for driving the chain B³ to drive the shaft B of the machine and the appliances driven therefrom. The reel on which the barbed wire is wound is mounted in the reel-frame between the side bars of the frame and is supported on one side by a bearing K' and on the opposite end or side by a journal of the bevel-gear K, by means of which and a bevel-pinion $k$ the reel is revolved to wind the wire thereonto. The bevel-pinion $k$ is fixed on the end of a shaft or spindle $k'$, having its bearing in the side bar of the reel-frame and having on its outer end a gear $j^2$, which meshes with a gear $j'$ on the end of a journal pin or spindle $j$, which has its bearing in the end bar of the reel-frame, and the gear $j'$ meshes with a gear $j^4$ on the hub of a controlling or brake wheel or disk L, mounted on the shaft $j^3$, by which brake wheel or disk the train of gear for operating the reel-gear can be rendered operative or inoperative, as may be required for revolving the reel to wind the wire thereonto. A bow of metal L', supported from a bracket L², attached to the bed or table of the machine and to which the bow is attached by a rivet $l^2$, is arranged for the arms of the bow to lie on opposite sides of the brake wheel or disk. One of the side arms or plates of the bow is longer than the other in the construction shown, and this arm has attached thereto a brake shoe or piece L³, and the opposite arm has attached thereto a brake shoe or piece L⁴, the attachment of the brake-shoes in each case, as shown, being by screws $l'$; but other suitable means could be used. Each brake shoe or piece has a semicircular opening, which openings receive the body of the brake wheel or disk, as shown in Figs. 3 and 5, so that by applying force or power to the longest arm or plate of the bow the brake shoes or pieces L³ and L⁴ will be clamped against the body of the brake-wheel, locking the wheel in a fixed position for the rotation of the reel-frame on its longitudinal axis to drive the gears $j'$ and $j^2$ over the fixedly-held gear $j^4$ of the brake wheel or disk, rotating the shaft $k'$ and through the bevel-pinion $k$ and gear K revolving the reel. The release of the impingement of the brake shoes or pieces L³ and L⁴ of the brake wheel or disk allows the brake wheel or disk to revolve with the reel-frame, permitting the gears $j'$ and $j^2$ to travel around with the loose gear $j^4$ without imparting rotation to the shaft $k'$, allowing the reel-frame to revolve on its longitudinal axis without revolving the reel. The engagement and disengagement of the brake shoes or pieces with the brake wheel or disk is automatically performed in coöperative relation with the movements of the butterfly-wheels in the advance of the barbed wire, and in the arrangement shown a connection for this purpose is provided by a rope L⁵, one end of which is attached to the extended end of the side arm or plate of the bow and the other end of which is attached to the lower end of the swinging or oscillating arm G, carrying the driven butterfly-wheel H², from which the barbed wire runs to the reel, and in order to give a straight line draw on the side arm or plate of the bow to force the brake shoes or pieces against the brake wheel or disk a link $l^4$, pivoted between ears $l^3$ and carrying a pulley-wheel $l^5$, is arranged for the rope to pass over the pulley-wheel between the ends of the bow and the swinging or oscillating arm, as shown in Figs. 3, 4, and 5. The free end of the opposite arm or plate of the bow can be fixedly held in position, if so desired, by a supporting-bar L⁶, one end of which is attached to the end of the arm or plate and the other end to the end support of the machine, as shown in Figs. 3 and 5. The arm or bar G, and with it the butterfly-wheel H², is held by the resistance-spring G³ at the proper limit of outward swing for feeding and winding the barbed wire onto the reel, and the arm or bar when in its advanced position for operating the reel draws the rope or cable L⁵ taut in the direction to draw or pull the extended arm or plate of the bow toward the brake wheel or disk, forcing the brake shoes or pieces against the periphery of the body of the brake wheel or disk, locking the wheel or disk in a fixed position for the rotation of the reel-frame to revolve the reel and wind thereonto the barbed wire, feeding or advancing the wire as required for the operation of the machine. The recession of the swinging or oscillating bar or arm from its advanced position by reason of too fast winding onto the reel and an excess of strain on the barbed wire from any cause serves to slack the cable or rope L⁵, relieving the draw or pull thereof on the extended arm or plate of the bow, releasing the pressure of the brake shoes or pieces on the brake wheel or disk, allowing the reel-frame to rotate or revolve on its longitudinal axis without revolving the reel and stopping the winding of the wire on the reel. The reel is revolved to take up the wire from the feeding mechanism when the carrying arm or bar and the butterfly-wheel are advanced under the tension of the spring, maintaining the parts in normal position for winding the wire onto the reel with the brake applied. An excess winding or too much strain on the wire automatically operates to render the reel inoperative as to winding the wire thereonto by releasing the brake through the connection between the swinging arm and the brake, and with the relief of overwinding or strain by reason of slack-wire from non-action of the reel the parts automatically return to position to apply the brake and revolve the reel. The upper butterfly feed-wheel swings or oscillates and the barbed wire passes therefrom over the fixed butterfly guide-wheel H' and from thence to the driven lower butterfly feed-wheel $H^2$, which is carried by the swinging arm or bar G, with the result that both the upper and lower butterfly-wheels have a swinging or oscillating movement in performing the feeding operation, which, in connection with the automatic application and release of the brake shoes or pieces from the movements of the pendent arm or bar G, insures the proper advance or feed of the barbed wire without the production of an injurious strain or movement that would affect the coiling mechanism for the barbs.

A plate M is attached to the bed or table of the machine by bolts $m$ or otherwise, and this plate carries a block or head M', to which is attached a half-box $M^2$ by means of a flange $m'$ on each side of the half-box and bolts $m^2$, and the half-box $M^2$ coacts with a half-box $M^3$, entered into the head or block M', the two half-boxes forming a complete box, in which is mounted a revoluble sleeve N, having at its forward end a flange or rim $n$, which abuts against the end face of the box or bearing. The interior of the sleeve N has located therein a pair of sliding bars N', which bars are arranged directly opposite each other, and each bar has a head or projection $n'$, carrying a coiling-pin $n^2$, which engage the cross-wires for the barb and coil the same around the strand or main wire. The sliding bars N' each has its body in a groove $n^5$, formed longitudinally of a sleeve $N^2$, which sleeve fits the interior of the sleeve N and is locked thereto by screws $n^7$, so that the two sleeves will revolve as one. The sleeve $N^2$ encircles a guide-tube $N^3$ for the passage of the strand or main wire, and the guide-tube $N^3$ at its discharge end is reduced in size exteriorly, forming a projecting end $n^3$, and the end of the sleeve $N^2$ is slotted inwardly to the face of the extension $n^3$ on opposite sides, into which slots $n^4$ the heads or projections $n'$ of the sliding bars N' extend, with a space $n^6$ between the end of the sleeve $N^2$ when the sliding bars are advanced sufficient for the withdrawal of the sliding bars to bring the twisting-pins $n^2$ out of position for engagement with the cross or barb wires. The rear end of the sleeve N has keyed or otherwise secured thereto a gear-wheel $N^4$, which meshes with a gear-wheel $N^5$ on the driving-shaft B, revolving the sleeve N and with it the sleeve $N^2$, and the sliding bars carrying the twisting-pins for the pins to act when projected to engage the cross or barb wires and twist such wires around the strand or main wire, attaching the barbs to the strand or main wire. The twisting-pins are advanced to be operative and receded to be inoperative by a vibrating or oscillating lever O, pivotally mounted on the bed or table of the machine and having a forked end, the arms $o$ of which are pivotally connected to a ring $O^2$ by pivotal bolts or pins $o^2$ or otherwise, and the ring $O^2$ is located in a circumferential groove or recess formed in a sliding collar or head O', mounted on the sleeve $N^2$ so as to be free to slide back and forth thereon. The collar or head O' is connected with the sliding bars N' by screws $o'$ or otherwise for the reciprocating movements of the sleeve to slide the bars to advance and recede the twisting-pins. The oscillating or vibrating lever O is mounted on a stud $O^3$ and is pivotally held in position on the stud by a pivot bolt or pin $o^3$ so as to be free to vibrate or oscillate. The tail end of this lever has a roller $o^7$, mounted on a pin or journal $o^8$, which roller engages with the faces $o^4$ and $o^5$ of a cam $O^4$. The faces of the cam are joined by an incline $o^6$ on each side of the cam, the roller riding up the incline $o^6$ on one side onto the raised face or section $o^5$ and riding down the incline $o^6$ on the opposite side of the cam onto the depressed face or section $o^4$ of the cam. The cam $O^4$ is attached to the shaft B so as to revolve therewith for its revolutions to cause the faces of the cam to engage the roller of the vibrating or oscillating lever and move the lever in the direction as the roller rides up the incline $o^6$ on the face or section $o^5$ to give a movement to the forked end of the lever by which the collar O' will be receded, withdrawing the twisting-pins from their advanced operative position. The passing of the roller down the opposite incline $o^6$ allows the spring $O^5$ to act and return the lever to normal position, giving the forked end an advance movement by which the collar O' will be carried forward, projecting the twisting-pins into their advanced or operative position. The spring $O^5$ is attached to the oscillating lever between the roller and pivot by a loop $o^9$, formed in the end of the spring, and the other end of the spring is attached to a pin or bolt $o^{10}$, entered into the end of a stud $o^{11}$ on the bed or table of the machine in the arrangement shown; but the spring could be otherwise attached, so long as its attachment is one by which a draw or pull action on the oscillating or vibrating lever will be attained for moving the lever and advancing the sliding collar to project the twisting-pins. The amount of projection for the pins is regulated and controlled by the contact of the roller $o^7$ on the end of the lever with the depressed face or section $o^4$ of the cam, the contact of the roller and face holding the twisting-pins in their projected operative position for the twisting of the barb wire or wires around the strand or main wire. The cam $O^4$ is so set on the driving-shaft B as to have the lifting-incline of the cam engage the roller as the twisting-pins finish the coiling operation on the cross or barb wires, withdrawing the pins from the operative position to the inoperative one, leaving the barb-wires twisted around the strand or main wire and in proper position to be severed by the cutters. The twisting-pins will remain inoperative or in their receded position so long as the roller of the vibrating or oscillating lever is in engagement with the raised face or section $o^5$ of the cam, during which time the cross-wires for the barb will have been severed and the barb will have been carried forward by the feed of the main or strand wire to the point for the attachment of another barb. The cross or barb wires will then be advanced through and across the strand or main wire into position to be caught by the twisting-pins, which as the roller leaves the raised face or section of the cam are projected so as to engage the barb or cross wires and coil or twist these wires around the strand or main wire for another barb. The advancing and receding of the twisting-pins will continue so long as the machine is operated in applying the barbs, and the movements of the twisting-pins are automatically performed at the proper time through the movement of the vibrating or oscillating lever by means of the cam and the return-spring.

A cross-shaft P is suitably mounted on the bed or table of the machine at the rear of the twisting mechanism for the barbs, and this shaft at each end has fixed thereto a bevel-gear $p$, each gear $p$ meshing with a companion gear $p'$ on a shaft $P'$, which shafts are located one on each side of the machine and run parallel with the bed or table. Each shaft $P'$ is supported in uprights or standards $Q'$, extending up from a plate Q, attached to the side bar or rail of the bed or table by bolts $q$, as shown, or otherwise, and a standard or upright $Q^2$, likewise attached to the side bar or rail of the machine by bolts $q$, as shown, or otherwise. The standards or uprights $Q'$ on each side carry a shaft $P^2$, located in a higher plane than the shaft $P'$ and of a less length. Each shaft $P'$ has fixed thereon a gear $p^2$, which meshes with a gear $p^3$ for driving the shaft $P^2$ from the shaft $P'$, and the two shafts $P'$ and $P^2$ on each side of the machine are given a unity of rotation by means of the cross-shaft P and the beveled gears $p$ and $p'$, so that the feeding mechanism operated from and by these shafts will have a corresponding movement simultaneously. The shafts $P'$ and $P^2$ have an intermittent rotation given thereto from the shaft $P'$ on one side of the machine. This shaft on one end has fixedly attached thereto a ratchet-wheel $P^3$, the teeth of which are successively engaged by a pawl $p^4$, pivotally mounted on a rocking arm $P^4$ and having its acting end held in engagement with the teeth of the ratchet-wheel by a spring $p^5$, bearing against the base end of the pawl and attached to the arm $P^4$. The arm $P^4$ is loosely mounted on the end of the shaft $P'$ and is free to oscillate thereon. The arm $P^4$ has in its body a slot $P^5$, through which passes a pivot-pin $p^6$ on the end of a link $P^6$, the other end of which link is attached to a pin or pivot $p^{10}$ on a disk or plate $P^7$, mounted on the end of the driving-shaft C adjacent to a plate or disk $p^8$, having a hub fixedly attached to the end of the shaft by a set-screw $p^9$, the end face of the hub abutting against the end face of the box or bearing $c$ of the shaft, the two disks or plates $p^7$ and $p^8$ constituting an eccentric $P^7$, of which one section, formed by the plate $p^7$, is adjustable on the other section, formed by the plate $p^8$. The disk or plate $P^7$ is adjustably attached to the disk or plate $p^8$ by slots $p^{11}$ and set-screws $p^{12}$, so that the disk or plate $P^7$ can be properly adjusted and regulated for its rotation to give the proper reciprocating movement to the link or connecting-bar $P^6$ to oscillate or vibrate the arm or lever $P^4$ the distance required to cause the pawl $p^4$ to act on the ratchet-wheel $P^3$ and turn the shaft $P'$ as required to operate the feeding mechanism for the cross or barb wires and feed such wires forward the distance required to form the barbs and the coil therefor around the strand or main wire. The operation of the feed for the cross or barb wires begins with the severing or cutting of the barb-wires and after a barb has been coiled and moved forward out of the way for the next barb.

The shafts $P'$ and $P^2$ on each side of the machine carry the feed-wheels for the cross or barb wires, a feed-wheel being attached to each shaft and in such relation as to run close together and in the same plane and so as to impinge or bear on the cross or barb wire sufficiently to cause the rotation of the feed-wheels to advance the cross or barb wires. Each cross or barb wire, carried by a suitable spool or holder, (not shown,) is entered between the feed-wheels, passing through a guide $r$ on a plate $R'$, attached by bolts $r'$ or otherwise to one of the uprights or standards $Q'$, so as to have the opening in the guide for the wire in line with the bite of the feed-wheels. The cross or barb wire on each side is fed from the feed-wheels into a guide $R^3$, which may be in the shape of two plates with a guide groove or recess $r^2$ for the passage of the wire, or the guide may be otherwise formed. As shown, the guide $R^3$ is attached by bolts $r^3$ or otherwise to a shelf $R^4$, extending out from a plate $R^5$, attached by bolts $r^4$ or otherwise to one of the uprights $Q'$, so that when in place the cross or barb wire on each side will enter and pass through the guide $r$ between the feed-rollers R and into and through the guide $R^3$ to the guide-cutters, by which the wire for the barbs is directed and projected properly in relation to the strand or main wire. The cross or barb wire on each side after leaving the guide $R^3$ enters a guide-cutter S, having its inner end beveled or cut on a diagonal line to its body, forming a cutting edge *s* for severing the wire, which passes through a groove or recess *s'* in the guide-cutter, as shown in Fig. 10. Each guide-cutter S is mounted on a support or base S' and is held in position by a clamping-plate $S^2$ and clamping-bolts $s^2$, which enables the guide-cutters to be adjusted properly to perform the cutting or severing operation and to feed the wire through the groove or recess *s'* between or in correct relation to the strand or main wire. Each support or base S' is pivotally mounted on adjustable journal-pins $s^3$, an adjustable pin being used on each side of the support or base, each journal-pin having its body screw-threaded and passing through a lug or ear $s^4$, extending up from the heads M' and $M^4$ of the plate M, as shown in Figs. 6 and 8, and each journal-pin, when properly adjusted to furnish the pivotal connection for the support or base, is locked in its adjusted position by a set-nut $s^5$, operating on the screw-thread of the pin, as shown in Fig. 6. Extending up from each support or base on each side thereof is a standard or upright $S^3$ which, as shown have an outward curve at the upper end. A roller $s^6$, mounted on a journal-pin $s^7$, is located between the open ends of the standards or uprights, which roller is engaged by a projection or rib $s^8$ on a disk $S^4$, fixedly connected with the shaft B and revolving therewith for the revolving of the disk to cause the projection or rib $s^8$ to engage the roller $s^6$ and turn the standards inwardly on their journals or pivots, giving the cutting ends of the guide-cutters S a downward throw for severing or cutting the cross or barb wires on each side of the strand or main wire, each guide-cutter operating to cut or sever the barb or cross wire fed therethrough. The guide-cutters are each returned to normal position after severing the cross or barb wires by a spring $S^5$, one end of which is connected to an eye $s^9$ on one of the uprights or standards $S^3$ and the other end of which is connected to a screw or pin $s^{10}$, projecting up from one of the uprights or standards Q', as shown in Fig. 8. The return of each guide-cutter to normal position occurs after the projection or rim $s^8$ passes the roller $s^6$ for the roller to rest on the plane surface of the disk $S^4$, holding the uprights or standards and the guide-cutter in position for the cross or barb wire to enter between the two wires of the strand or main wire and between the coiling-pins which are in their advanced or projected position, the pins during the cutting and severing operation being in their withdrawn or receded position. The cam for operating the sliding bars carrying the coiling-pins and the disk for operating the guide-cutters are set in such relation to each other as to have the cam operate the sliding bars and withdraw the twisting or coiling pins before the projection or rib on the disk operates the guide-cutters to sever the wire after the completion of the twisting or coiling of the barb on the strand or main wire. The feed of the cross or barb wires begins after the guide-cutters have returned to normal position, at which time the dog or pawl for the ratchet-wheel is being advanced to revolve the feed-wheel, and with the cessation of the advance throw of the pawl or dog and the commencement of the return movement thereof the feed-wheels become idle and the feeding of the cross or barb wires is discontinued, and during this period of rest the guide-cutters are actuated to sever or cut the cross or barb wires after the completion of the coiling thereof by the twisting-pins. The guide-cutters coact with two cutters secured to a head $M^4$ on the plate M, between which head and the head M' of the plate is an opening in line with the terminus of the guide-cutters to permit of the turning of the ends of the barb-wires in coiling the wires around the strand or main wire. Each cutter T has its acting end *t* cut diagonally or on an incline to be in the plane of the acting end of its companion guide-cutter, so that with the downward movement of the acting end of the guide-cutter the cross or barb wire will be severed between the acting ends of the two cutters. Each cutter T is held in position, so as to be adjustable endwise on the head $M^4$, by a clamp-plate T' and clamping-screws $t'$, and each cutter is adjusted endwise by an adjusting-screw $T^2$, the stem of which threads into a lug or ear $t^2$ on the head $M^4$, so that by turning the adjusting-screws with the clamp-plate sufficiently raised the fixed cutters can each be advanced for its acting end to be in proper relation with the acting end of the companion guide-cutter to perform the cutting off of the barb from the cross or barb wire.

The strand or main wire in the arrangement shown consists of two wires, which wires run from carrying-spools (not shown) under a guide-wheel U, having in its circumferential face two grooves *u*, one for each wire, which guide-wheel is suitably journaled on a pin or journal at the upper end of a standard or upright U', having a flange or foot *u'*, by means of which and suitable bolts or otherwise the standard or upright is attached to the bed or table of the machine. The two wires after leaving the guide-wheel U pass into the guide-tube $N^3$, which tube at its rear end is supported in a head or socket $u^2$ on the upper end of a standard or upright $U^2$, bolted or otherwise fixed on the bed or table of the machine. The two wires entering the rear end of the guide-tube $N^3$, which tube is fixed and around which the sleeve carrying the twisting-pins revolves, will pass out at the forward end of the guide-tube in line with the discharge grooves or recesses of the guide-cutters when in normal position, so that the cross or barb wires will be forced in a diagonal relation to each other between the two wires of the strand or main wire and in position to be caught up by the twisting-pins and coiled around the two wires of the strand or main wire from the inside or between the two wires to the outside of such wires, completing the coil, as shown in Fig. 17. The barbed wire from the driven lower butterfly feed-wheel $H^2$ passes through the open journal $J'$ of the reel-frame to a butterfly-wheel V, having a center or hub $v$ and wings $v^2$, with slots $v^3$, and having the hub screw-threaded and running on a screw-thread $v'$ of a supporting rod or shaft $V'$, by means of which the butterfly-wheel V travels back and forth for the winding of the barb wire on the reel, as usual. The reel W, as shown, is formed of crossed end pieces $w$ and $w'$ and connecting center pieces $w^2$, and the wire is wound onto the center pieces or core and between the crossed end pieces. The reel is held in the reel-frame by the journal of the bevel-gear K and the support $K'$, the journal-pin being slidable to permit of the placing of a reel in position and the removal of the reel after it is filled in the usual manner. The two wires X and $X'$ form the strand or main wire, and the cross or barb wires Y and $Y'$ are forced or fed between the strand or main wire to be caught by the twisting-pins and coiled or twisted around the strand or main wire, forming a double barb Z or barb with four prongs, as shown in Fig. 17, for the completed wire. Instead of using two cross or barb wires a single cross or barb wire could be used, fed from one side or the other of the machine, and with this construction a single barb $Z'$ or barb having two prongs would be formed for the completed wire, as shown in Fig. 18.

The operation will be understood from the foregoing description of the mechanisms, but briefly is as follows: The two wires for the strand or main wire are threaded by hand or otherwise from their spools into and through the guide-tube $N^3$ for their ends to project beyond the end of the guide-tube in proper position for the passage of the cross or barb wires between the two wires of the strand or main wire. The feed-wheels are actuated at the proper time to feed the cross or barb wires forward between the two wires of the strand or main wires. The twisting-pins are advanced from their withdrawn position into position to engage the cross or barb wires, and by the revolution of the carrying-sleeves for the sliding bars the twisting pin or pins are revolved to twist or coil the cross or barb wires around the strand or main wire. The depressible guide-cutters are actuated to sever the barb from the cross or barb wires at the completion of the coiling by the action of the disk, having the projection or rib thereon against the roller of the standards or uprights of the base or support carrying the depressible guide-cutters. The butterfly feed-wheel H is then actuated by the link $I'$, the pivoted lever, and the cam to advance the strand or main wire into position for the projection of the cross or barb wires by the feeding devices therefor to enter the necessary length of wire for the next barb, which during the return movement of the butterfly feed-wheel H is twisted or coiled around the main wire and severed, and these operations are continued until the barbs for the length of strand or main wire are applied. The driven lower butterfly feed-wheel acts on the wire fed forward by the upper feed-wheel, holding the wire on the return movement of the upper feed-wheel, and the barbed wire from the driven lower wheel is wound onto the reel by the revolving of the reel-frame, the cessation of the revolution of the reel by the wire drawing against the driven lower butterfly feed-wheel and moving the swinging or oscillating arm, carrying such wheel inward, and releasing the brake on the brake wheel or disk makes the necessary provision as the diameter of the reeled wire increases for winding only the length of wire fed forward at each advance of the upper feed-wheel. The upper feed-wheel is carried forward by its swinging arm to advance or feed the wire after the completion and severing of a barb the distance required for positioning the strand or main wire to receive the next succeeding barb, which barb is applied during the receding movement of the upper feed-wheel, the driven lower feed-wheel taking up the wire fed or advanced by the upper feed-wheel for such wire to be wound on the reel. The feeding action of the upper feed-wheel is an intermittent one, each advance movement commencing with the completion and severing of the barb and continuing until the strand or main wire is carried into position for the next barb and each receding movement commencing after the completion of the advance movement without affecting the strand or main wire, which remains stationary, and continuing during the time that the cross or barb wires are fed forward, the twisting-pins advanced and revolved, twisting or coiling the barb-wires into and around the strand or main wire, and the cutters are depressed to sever the cross or barb wires, and the length of wire advanced at each feeding operation, with the swinging or oscillating arm in normal position applying the brake shoes or pieces to the brake wheel or disk to revolve the reel, is wound onto the reel. The parts are so timed as to have the operation of the butterfly feed-wheels, the twisting or coiling mechanism, the mechanism for feeding the the cross or barb wires, the cutting mechanism, and the reel and its controlling-brake operate at the proper time and in correct relation one to the other for each to perform its respective office without interfering with the operation of the other.

What I regard as new, and desire to secure by Letters Patent, is—

1. In a barb-wire machine, the combination of an oscillating upper feed-wheel pivotally mounted and supported below the plane of its oscillation, an oscillating lower feed-wheel pivotally mounted and supported above the plane of its oscillation, one mounting independent of the other and the two wheels having opposite directions of oscillation, and a fixed intermediate guide-wheel over which the barb-wire travels for intermittently feeding the wire, substantially as described.

2. In a barb-wire machine, the combination of a revoluble shaft, an oscillating upper feed-wheel pivotally mounted and supported below the plane of its oscillation, an oscillating lower feed-wheel pivotally mounted and supported above the plane of its oscillation, a fixed intermediate guide-wheel, a vibratable arm pivotally mounted at its lower end and carrying the oscillating upper feed-wheel, and a swinging arm pivotally mounted at its upper end and carrying the oscillating lower feed-wheel, the two arms having an opposite oscillation or swing, substantially as described.

3. In a barb-wire machine, the combination of a revoluble shaft, an oscillating upper feed-wheel, an oscillating lower feed-wheel, a fixed intermediate guide-wheel, a vibratable arm pivotally mounted at its lower end and carrying at its upper end the oscillating upper feed-wheel, a swinging arm pivotally mounted at its upper end and carrying the oscillating lower feed-wheel, a link pivotally connected at one end with the arm carrying the upper feed-wheel, a rocking lever having the link pivotally connected to one of its ends, and a cam on the revoluble shaft engaging the upper end of the rocking lever, substantially as described.

4. In a barb-wire machine, the combination with an intermittent feed for the barb-wire, of a swinging arm carrying the lowermost one of the intermittent feed-wheels, a brake wheel or disk controlling the operation of a train of gear for revolving the reel for the barb-wire, a brake for the wheel or disk, a connection between the brake and the swinging arm, and means for returning the swinging arm to normal position, substantially as described.

5. In a barb-wire machine, the combination of an oscillating upper feed-wheel, an oscillating lower feed-wheel, a swinging arm carrying the oscillating lower feed-wheel, a reel-frame carrying the reel, a train of gear on the reel-frame for revolving the reel, a brake wheel or disk loosely mounted on the shaft of the reel-frame, a brake for the wheel or disk, a connection between the brake and the swinging arm carrying the lower feed-wheel, and means for returning the swinging arm to normal position, substantially as described.

6. In a barb-wire machine, the combination of an oscillating upper feed-wheel, an oscillating lower feed-wheel, a swinging arm carrying the oscillating lower feed-wheel, a reel-frame carrying the reel, a train of gear on the reel-frame for revolving the reel, a brake wheel or disk loosely mounted on the shaft of the reel-frame, a brake for the wheel or disk, a connection between the brake and the swinging arm carrying the lower feed-wheel, and a spring for returning the swinging arm to normal position, substantially as described.

7. In a barb-wire machine, the combination of a revoluble outer sleeve, an inner sleeve within the revoluble outer sleeve and fixedly connected thereto and revoluble therewith and extending at its rear end beyond the end of the outer sleeve, a pair of sliding bars carried by the inner sleeve and located in grooves on opposite sides of the sleeve, each bar of the length of the sleeve and having a head at its forward end with a projected twisting-pin, a slidable collar mounted on the extended rear end of the inner sleeve and free to slide thereon and connected with both of the sliding bars, a lever for actuating the slidable collar and reciprocating the sliding bars to advance and recede the twisting-pins, and a fixed guide for the strand or main wire at the axial center of the inner sleeve, substantially as described.

8. In a barb-wire machine, the combination of a revoluble shaft, a revoluble outer sleeve, a gear connection between the revoluble shaft and the revoluble outer sleeve, an inner sleeve within the revoluble outer sleeve and fixedly connected thereto and revoluble therewith and extending at its rear end beyond the end of the outer sleeve, a pair of sliding bars carried by the inner sleeve and located in grooves on opposite sides of the sleeve, each bar of the length of the sleeve and having a head at its forward end with a projecting twisting-pin, a slidable collar mounted on the extended rear end of the inner sleeve and free to slide thereon and connected with both of the sliding bars, a lever for actuating the slidable collar and reciprocating the sliding bars to advance and recede the twisting-pin, a cam on the revoluble shaft for moving the lever in one direction, and a fixed guide-tube for the strand or main wire at the axial center of the inner sleeve, substantially as described.

9. In a barb-wire machine, the combination of a revoluble shaft, a revoluble outer sleeve, a gear connection between the revoluble shaft and the revoluble outer sleeve, an inner sleeve within the revoluble outer sleeve and fixedly connected thereto and revoluble therewith and extending at its rear end beyond the end of the outer sleeve, a pair of sliding bars carried by the inner sleeve and located in grooves on opposite sides of the sleeve, each bar of the length of the sleeve and having a head at its forward end with a projecting twisting-pin, a slidable collar mounted on the extended rear end of the inner sleeve and free to slide thereon and connected with both of the sliding bars, a lever for actuating the slidable collar and reciprocating the sliding bars to advance and recede the twisting-pin, a cam on the revoluble shaft for moving the lever in one direction, a spring for moving the lever in the opposite direction, and a fixed guide-tube for the strand or main wire at the axial center of the inner sleeve, substantially as described.

10. In a barb-wire machine, the combination of a revoluble outer sleeve, an inner sleeve within the outer sleeve and connected thereto and revoluble therewith and extending at its rear end beyond the end of the outer sleeve, grooves on opposite sides of the inner sleeve, recesses at the forward end of the inner sleeve in line with the grooves, a sliding bar entered into each groove and extending the length of the inner sleeve, a head on the forward end of each sliding bar movable in the recesses of the inner sleeve, a projecting pin on each head, a slidable collar mounted on the extended rear end of the inner sleeve and free to slide thereon and connected with both of the sliding bars, means for revolving the outer sleeve, means for reciprocating the slidable collar, and a fixed guide-tube for the passage of the strand or main wire at the axial center of the inner sleeve, substantially as described.

11. In a barb-wire machine, the combination of a depressible guide-cutter having an inclined cutting edge at its inner corner and having a longitudinal hole for the passage of the cross or barb wire, a rocking bed or support carrying the cutter, and a stationary cutter having an inclined cutting edge at its outer corner with which the cutting edge of the depressible cutter coacts to sever the cross or barb wire carried by the depressible cutter, substantially as described.

12. In a barb-wire machine, the combination of a depressible guide-cutter for the cross or barb wire, a rocking bed or support for the cutter, journal-pins pivotally mounting the rocking bed or support, arms or standards upwardly extending from the bed or support, means for engaging the arms or standards and depressing the guide-cutter, and a stationary cutter with which the depressible cutter coacts to sever the cross or barb wire, substantially as described.

13. In a barb-wire machine, the combination of a revoluble shaft, a depressible guide-cutter, for the cross or barb wire, a rocking bed or support carrying the cutter, journal-pins pivotally mounting the bed or support, standards or uprights upwardly extending from the bed or support, a roller at the upper end of the standards or uprights, a disk on the revoluble shaft having a projection or rib engaging the roller for moving the standards or uprights to depress the guide-cutter, and a stationary cutter with which the depressible cutter coacts to sever the cross or barb wire, substantially as described.

14. In a barb-wire machine, the combination of a pair of shafts geared together to rotate in unison, means for intermittently revolving the shafts, a feed-disk on each shaft, feed-guides for the cross or barb wire coacting with the feed-disks, a depressible guide-cutter coacting with the feed-guides, a rocking bed or support carrying the guide-cutter, journal-pins pivotally mounting the bed or support, standards or uprights upwardly extending from the bed or support, means for moving the standards or uprights to depress the guide-cutter, and a stationary cutter with which the guide-cutter coacts to sever the cross or barb wire, substantially as described.

15. In a barb-wire machine, the combination of a revoluble shaft, a pair of shafts on each side of the machine, each pair geared for the shafts of the pair to rotate in unison, means for intermittently revolving one of the pair of shafts on one side of the machine from the revoluble shaft, a cross-shaft in geared connection with one of each pair of shafts for revolving both pairs of shafts simultaneously and intermittently, a feed-guide for a cross or barb wire on each side of the machine, feed-disks on each side of the machine one for each shaft of the pair of shafts coacting with the feed-guides, a pair of depressible guide-cutters one guide-cutter for each side of the machine and coacting with the feed-guides, a rocking bed or support for each guide-cutter, journal-pins pivotally mounting each bed or support, standards or uprights upwardly extending from each bed or support, means for moving the standards or uprights to depress each guide-cutter, and stationary cutters one for each guide-cutter and with which the guide-cutter coacts to sever the cross or barb wire, substantially as described.

JOHN E. FREDRICK.

Witnesses:
THOMAS A. BANNING,
OSCAR W. BOND.